Oct. 10, 1961 F. A. VOTTA, JR 3,003,357
MOTION TRANSMITTING DEVICE
Filed Jan. 25, 1960 2 Sheets-Sheet 1

INVENTOR.
FRANK A. VOTTA, Jr.
BY

ATTORNEYS

Oct. 10, 1961 F. A. VOTTA, JR 3,003,357
MOTION TRANSMITTING DEVICE
Filed Jan. 25, 1960 2 Sheets-Sheet 2

INVENTOR.
FRANK A. VOTTA, Jr.
BY
ATTORNEYS

900
United States Patent Office 3,003,357
Patented Oct. 10, 1961

3,003,357
MOTION TRANSMITTING DEVICE
Frank A. Votta, Jr., Ambler, Pa., assignor to American Machine and Metals, Inc., New York, N.Y., a corporation of Delaware
Filed Jan. 25, 1960, Ser. No. 4,511
11 Claims. (Cl. 74—95)

This invention relates to a motion transmitting device of the type wherein rotary motion is translated into linear motion.

There are, in a broad sense, generally two types of devices for translating a rotary action into a linear motion. The most commonly used type employs a gear which engages a toothed rack. The other type employs a cord or ribbon mounted on a rotary drum along with some type of spring cooperating with the rotary drum to apply a torque thereto to maintain a tension on the cord.

It is an object of this invention to eliminate the need for a separate spring to maintain tension on the ribbons used in motion transmitting devices of the indicated type.

Another object of this invention is to provide a motion transmitting device of the indicated type which can sustain large external loads without failure.

Another object of this invention is to construct a device of the indicated type with a minimum number of parts which will render it economical to manufacture and facilitate installation and repair.

The above and other objects and features of the invention will appear more fully from a consideration of the following description taken in connection with the accompanying drawings wherein.

Figure 1:
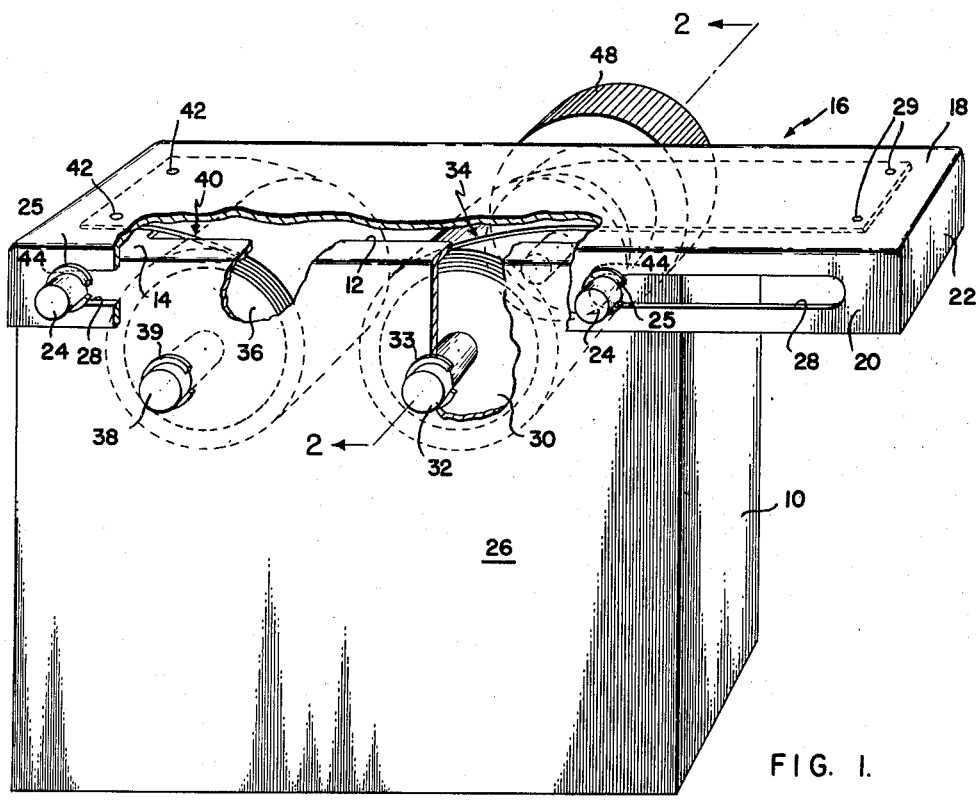
FIGURE 1 is a perspective view of a preferred embodiment of the invention.

Referring to the drawings, the motion transmitting device of this invention comprises a box-like support member 10 which has a rectangular slot 12 in the upper wall 14 thereof. An elongated member indicated generally at 16 is provided and comprises a top side 18, a pair of oppositely disposed sides 20 and a pair of oppositely disposed ends 22. Member 16 is mounted on support member 10 for linear movement in a longitudinal direction by means of a pair of shafts 24 projecting outwardly from side walls 26 of support member 10 into a plurality of longitudinally extending slots 28 in sides 20. Shafts 24 are retained in side walls 26 by means of retaining rings 25. By this arrangement, side 18 overlies slot 12 in support member 10.

It will thus be apparent that an effective means is provided for guiding member 16 for linear movement. Shafts 24 cooperate with slots 28 to permit linear movement of member 16 but restrict movement thereof in a direction normal to the linear movement. Also, as is best shown in FIGURE 2, sides 20 cooperate with the walls 26 of support member 10 to prevent lateral movement of member 16.

The rotary means in accordance with this invention comprises a drum 30 fixedly secured to a shaft 32 which is mounted for rotation in side walls 26 and is retained therein by retaining rings 33 which restrict axial movement of shaft 32. A normally tightly coiled ribbon spring 34 is partially coiled on drum 30. Such springs are also known as noncumulative force springs and are also sometimes referred to as constant force springs. Suitable springs and mountings are disclosed, for example, in Patent No. 2,609,191, issued September 2, 1952 and Patent No. 2,609,192, issued September 2, 1952. The free end of spring 34 is secured to member 16 adjacent an end of side 18 by suitable means such as rivets 29, to thereby bias member 16 toward the left as viewed in FIGURE 1.

Figure 2:
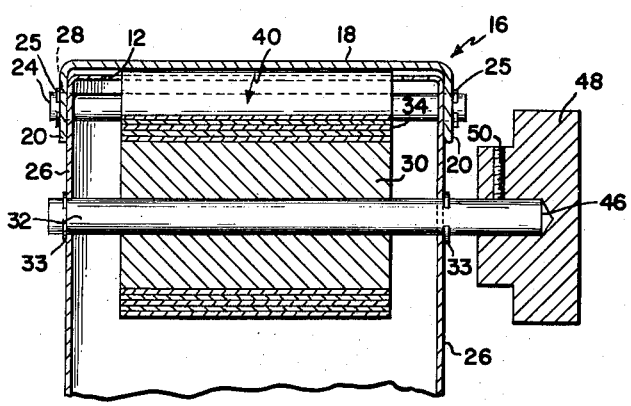
FIGURE 2 is a section taken on the plane indicated by line 2—2 of FIGURE 1.

In the embodiment of the invention shown in FIGURES 1 and 2, another drum 36 is fixedly secured to a shaft 38 which is mounted for rotation in walls 26 in parallel relation to shaft 32 and is retained in walls 26 by retaining rings 39 which restrict axial movement of shaft 38. A normally tightly coiled ribbon spring 40 is partially coiled on drum 36 with the free end secured to side 18 of member 16, as by rivets 42, to bias member 16 toward the right as viewed in FIGURE 1. Springs 34 and 40 are similar and may have a relatively low or zero spring gradient with spring 40 always exerting a greater force than spring 34 in order to bias rack member 16 at all positions thereof toward the reference or zero position shown in FIGURE 1.

The reference or zero position may be determined by the stop provided by the ends 44 of slots 28 or may be in accordance with an equilibrium position which is attained when spring 40 is in its completely coiled position. While it is preferred to have springs 34 and 40 with a substantially zero gradient, tightly coiled ribbon springs having positive or negative gradients may be used as long as spring 40 exerts a greater force than spring 34 at all positions of member 16 to maintain a bias on member 16 urging the same toward the reference or zero position.

Means are provided for rotating drum 30 to cause coiling of spring 34 to thereby move member 16 linearly within the guide therefor. This rotary means comprises a circular knob 48 secured to the end 46 of shaft 32 projecting from wall 26 of support member 10. Knob 48 is fixedly secured to shaft 32 by any suitable means, such as a locking screw 50.

In the operation of the motion transmitting device shown in FIGURES 1 and 2, the parts will normally be maintained in the position shown in FIGURE 1 by reason of the bias of spring 40. When it is desired to cause linear motion of member 16, drum 30 is rotated in a counterclockwise direction as viewed in FIGURE 1 by manual rotation of knob 48. This rotary movement will cause spring 34 to coil on drum 30 thereby pulling member 16 to the left and uncoiling spring 40. Member 16 will move linearly by reason of the guide means restricting the member 16 to such movement.

When knob 48 is released, the bias of spring 40 will actuate member 16 back toward the reference or zero position as spring 40 coils and spring 34 is thereby uncoiled. Since the differential between the forces exerted by springs 34 and 40 will remain constant or relatively constant, the rack can be returned at any desired substantially uniform acceleration from any position by a proper selection of springs.

It is noted that when spring 34 is coiled to cause linear movement of member 16, the externally applied torque is unidirectional and is transmitted to member 16 through the extended portion of spring 34 which is under tension. Since the spring 34 can resist a substantial tensile load, the external force on member 16 may be of a substantial magnitude without damaging the spring 34.

While the ribbon spring 34 acts somewhat like a simple cord or ribbon by pulling upon coiling rotation of drum 34, this spring performs the added function of automatically maintaining tension by reason of its own recoiling tendency. Hence there is no need for any additional means to apply a torque to drum 30.

Figure 3:
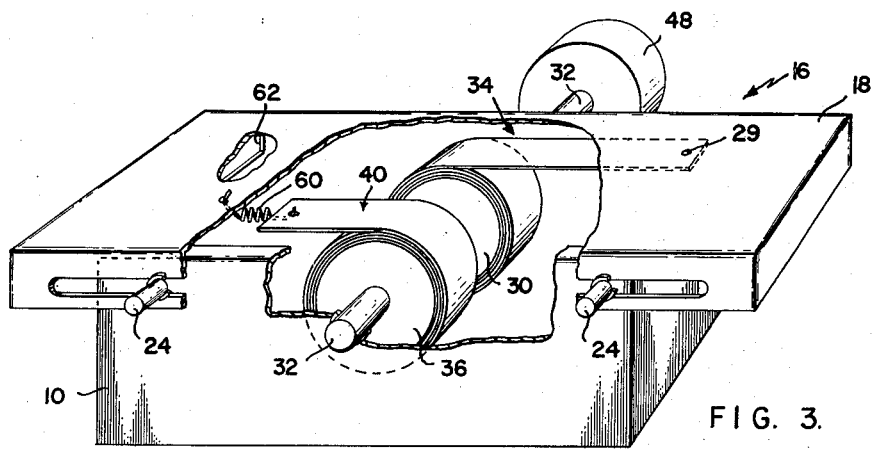
FIGURE 3 is a perspective view of another embodiment of the invention.

The embodiment of the invention shown in FIGURE 3, wherein parts corresponding to the parts herein described are given like reference numerals, is similar to the embodiment shown in FIGURES 1 and 2 but differs therefrom in that both drums 30 and 36 are coaxially and fixedly mounted on shaft 32 which is centrally mounted on support member 10. Member 16 and the mounting therefor are similar to the embodiment shown in FIGURES 1 and 2. The free ends of normally tightly coiled ribbon springs 34 and 40 extend in opposite directions from shaft 32 and are secured to member 16 to bias the same in opposite directions. The free end of ribbon spring 34 is secured to the side 18 of member 16 by rivet 29. The free end of ribbon spring 40 is secured to the side 18 of rack member 16 by an extension coil spring 60 which in the position shown in FIGURE 3 is under tension. The end of support member 10 adjacent to the free end of ribbon spring 40 has a cutaway portion 62 permitting movement of coil spring 60 through support member 10 when member 16 is moved to the left as viewed in FIGURE 3. Ribbon springs 34 and 40 are preferably constructed to have a low spring gradient and to exert substantially the same force.

In the operation of the embodiment shown in FIGURE 3, rotation of shaft 32 in a counterclockwise direction as viewed in FIGURE 3 by means of knob 48 will cause a coiling movement of ribbon spring 34 thereby moving member 16 to the left. When knob 48 is released, member 16 will remain in this position since the forces exerted by ribbon springs 34 and 40 are the same. When shaft 32 is moved in a clockwise direction as viewed in FIGURE 3, ribbon spring 40 will coil and ribbon spring 34 will uncoil whereby member 16 will move to the right to any desired position and will remain in this position even after knob 48 is released. Member 16 is thus linearly movable in either direction to any desired position in accordance with the the rotative movement applied to shaft 32 and will remain in this position by reason of the equal forces exerted by ribbon springs 34 and 40.

The flexible connection between shaft 32 and member 16 which is provided by extension coil spring 60 is not essential but advantageous in that it serves to compensate for the slight difference in ribbon spring travel. This difference in spring travel results when the ribbon springs 34 and 40 are in a condition where one of the springs is coiled more than the other and thus has a larger diameter. When the springs are in this condition, a unit rotation of shaft 32 will cause more of the larger diameter ribbon spring to be coiled about or uncoiled from the drum of the larger diameter spring. This causes a difference in linear travel of the free ends of ribbon springs 34 and 40. This difference in linear travel, which is of particular importance where the travel is great, is compensated for by the expansion or contraction of coil spring 60. Since spring 34 is inflexibly secured to member 16, the linear movement of member 16 is controlled by the linear movement of spring 34.

Figure 4:
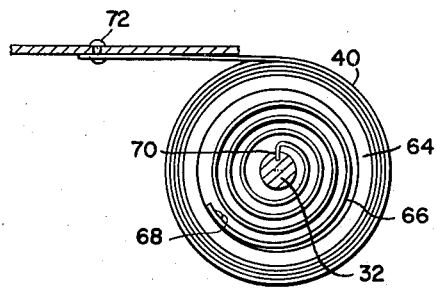
FIGURE 4 is an elevational view of a modified form of rotary drum means which may be used in the embodiment shown in FIGURE 3.

A modified form of flexible connection between shaft 32 and member 16 is shown in FIGURE 4 wherein ribbon spring 40 is mounted on a hollow drum 64. A spiral spring 66 is positioned within hollow drum 64 and has its outer end 68 riveted to the drum 64. This structure may be substituted for the drum 36 and coil spring 60 of the FIGURE 3 embodiment by connecting the inner end 70 of spiral spring 66 to shaft 32 and the free end of ribbon spring 40 to the side 18 of member 16 as by rivet 72.

In the operation of embodiment shown in FIGURE 4, the free ends of springs 34 and 40 will have an equal linear movement by reason of their fixed connection to member 16 and the amount of coiling and uncoiling spring travel will be the same. However, since the spring diameters are different, it is necessary that angular movement of drums 30 and 64 be different in order to accommodate for the same spring travel. The flexible connection between shaft 32 and member 16 provided by spiral spring 66 compensates for this difference in drum rotation.

The compensating action of spiral spring 66 may be illustrated by considering the operation when spring 40 is in a coiled condition and spring 34 is extended whereby spring 40 has a greater diameter than spring 34. In this case, a unit rotation of shaft 32 will cause drum 30 to rotate through an angle to accommodate the travel of spring 34. This unit movement of shaft 32 and drum 30 tends to cause a greater coiling and uncoiling of spring 40 on drum 64 by reason of the larger diameter of spring 40. However, since the free ends of spring 34 and 40 are connected to member 16, the spring travel must be the same. Hence, a portion of the rotation of shaft 32 is not transmitted to hollow drum 64 but is lost by the winding or unwinding of spiral spring 66 which is always partially wound. In this manner spiral spring 66 serves to compensate for a difference in drum rotation which is of particular importance where the travel is great.

Figure 5:
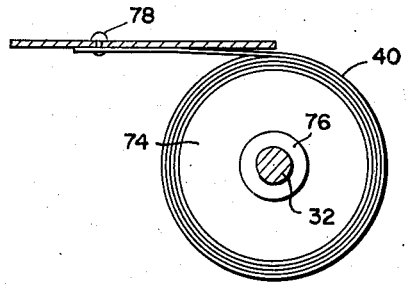
FIGURE 5 is an elevational view of another modified form of rotary drum means which may be used in the embodiment shown in FIGURE 3.

As shown in FIGURE 5, spring 40 may be mounted on a drum 74 which is mounted on a roller bearing 76 mounted on shaft 32 whereby drum 74 and shaft 32 are freely rotatable with respect to each other. Drum 74 and bearing 76 may be substituted for the drum 36 in the FIGURE 3 embodiment and the free end of ribbon spring 40 may be secured to the side 18 of member 16 as by a rivet 78.

If spring 40 is constructed to exert a greater spring force than spring 34, the operation will be similar to the FIGURE 1 embodiment. With spring 40 exerting a greater force than spring 34 and mounted on freely rotatable drum 74, member 16 will always be biased to a zero position and the drum 74 will compensate for any difference in drum rotation resulting from operation at different spring diameters.

Figure 6:
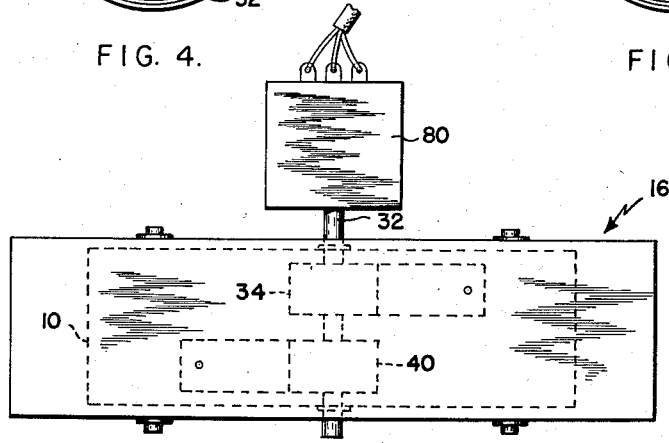
FIGURE 6 is an plan view of a further embodiment of the invention.

The embodiment of the invention shown in FIGURE 6 illustrates the use of the invention to transmit a linear movement into a rotary movement. This embodiment is similar to the FIGURE 3 embodiment but a reversal thereof with respect to operation in that the rack is moved linearly to cause rotary motion of the shaft which can, for example, be secured to a read-out device 80 for indicating the linear position of member 16. Read-out device 80 may be a helical pot, a servo or a mechanical indicator. The linear movement of member 16 is transmitted into a rotary movement of shaft 32 through the springs 34 and 40. The rotation of shaft 32 is utilized to indicate the linear position of member 16 by means of the read-out device 80.

It will be apparent that the invention will have many uses wherein the conversion between rotary motion and linear motion is desired. Moreover, it is not desired to be limited except as set forth in the following claims.

What is claimed is:

1. A motion transmitting device comprising a support means, a member, means mounting said member on said support means for linear movement, a tightly coiled ribbon spring mounted for coiling and uncoiling movement, means mounting said spring on said support means, an extended free end of said spring being connected to said member, and a spiral spring means connected to said member and to said support means to bias said member in a direction opposite to said ribbon spring, and rotatably mounted motion transmitting means operatively connected to said ribbon spring for rotation in accordance with the coiling and uncoiling of said ribbon spring, said motion transmitting means being rotatable to cause coiling of said ribbon spring and linear movement of said member or alternatively rotatable in accordance with coiling and uncoiling movement of said ribbon spring in response to linear movement of said member.

2. A motion transmitting device comprising a support means, a member, means mounting said member on said support means for linear movement, a rotatably mounted drum means, means mounting said drum means on said support means, a tightly coiled ribbon spring mounted for coiling and uncoiling movement on said drum means, an extended free end of said spring being connected to said member, a second tightly coiled ribbon spring coiled in a sense opposite to the coiling of said first mentioned spring and having an extended free end secured to said member, means mounting said second spring on said support means for coiling and uncoiling movement, said second spring exerting a force greater than said first mentioned spring to return said member to its starting position, and manually operable means for rotating said drum to coil said first mentioned ribbon spring to cause linear movement of said member.

3. A motion transmitting device comprising a support means, a member, means mounting said member on said support means for linear movement, a first rotatably mounted drum means, means mounting said first drum means on said support means, a first tightly coiled ribbon spring coiled on said drum means, an extended free end of said first spring being connected to said member, a second rotatably mounted drum means, means mounting said second drum means on said support means, a second tightly coiled ribbon spring coiled on said second drum means in a sense opposite to the coiling of said first spring and having an extended free end connected to said member, said second spring exerting a bias to overcome the bias of said first spring to return said member to a reference position and means for rotating said first drum to coil said first ribbon spring to cause linear movement of said member away from said reference position.

4. A motion transmitting device comprising a support means, a member, means mounting said member on said support means for linear movement, a tightly coiled ribbon spring having an extended free end connected to said member to bias said member in one direction, rotatable means mounting said ribbon spring on said support means for coiling and uncoiling movement, second spring means connected to said member and said support means to bias said member in a direction opposite to said ribbon spring, and rotatably mounted motion transmitting means operatively connected to said ribbon spring for rotation in accordance with the coiling and uncoiling of said ribbon spring, said motion transmitting means being rotatable to cause coiling of said ribbon spring and linear movement of said member or alternatively rotatable in accordance with coiling and uncoiling movement of said ribbon spring in response to linear movement of said member.

5. A motion transmitting device comprising a support means, a member, means mounting said member on said support means for linear movement, shaft means, means rotatably mounting said shaft means on said support means, a pair of drum means mounted on said shaft means, a first tightly coiled ribbon spring mounted for coiling and uncoiling movement on one of said drum means and having an extended free end connected to said member, a second tightly coiled ribbon spring coiled on the other of said drum means in a sense opposite to the coiling of said first spring and having an extended free end secured to said member whereby alternatively rotation of said shaft means is transmitted into linear movement of said member or linear movement of said member is transmitted into rotation of said shaft means.

6. A device as claimed in claim 5 wherein said first and second springs exert the same force on said member to retain said member in the position to which it is actuated by said shaft means.

7. A device as claimed in claim 5 comprising means including said first spring and said one drum means inflexibly connecting said shaft means to said member and second means including said second spring and said second drum means flexibly connecting said shaft means to said member.

8. A device as claimed in claim 7 wherein said flexible connection comprises a resilient connection between said second drum and said shaft means.

9. A device as claimed in claim 5 wherein said pair of drum means are fixedly mounted on said shaft means and including a spring connected between said extended free end of said second spring and said member.

10. A device as claimed in claim 5 wherein said one drum means is fixedly connected to said shaft means and said other drum means is freely rotatable on said shaft means.

11. A motion transmitting device comprising a support means, a member, means mounting said member on said support means for linear movement, a first rotatably mounted spool means, means mounting said first spool means on said support means, a first tightly coiled ribbon spring tightly mounted on said first spool means for coiling and uncoiling movement, an extended free end of said spring being connected to said member, a second rotatably mounted spool means, means mounting said second spool means on said support means, a second tightly coiled ribbon spring tightly mounted on said second spool means, coiled in a sense opposite to the coiling of said first spring, and having an extended free end secured a said member, said second ribbon spring urging said member in a direction opposite to said first spring, and rotatably mounted motion transmitting means operatively connected to said first ribbon spring for rotation in accordance with coiling and uncoiling thereof, said motion transmitting means being rotatable in one direction to coil said first ribbon spring and to cause linear movement of said member and alternatively rotatable in either direction in accordance with a coiling or uncoiling movement of said first ribbon spring in response to linear movement of said member.

References Cited in the file of this patent

UNITED STATES PATENTS

| | | |
|---|---|---|
| 1,977,546 | Fornelius | Oct. 16, 1934 |
| 2,175,516 | Bugatti | Oct. 10, 1939 |
| 2,609,193 | Foster | Sept. 2, 1952 |
| 2,677,923 | Parker | May 11, 1954 |
| 2,797,435 | Decker et al. | July 2, 1957 |
| 2,919,500 | Simpson et al. | Jan. 5, 1960 |

UNITED STATES PATENT OFFICE
CERTIFICATE OF CORRECTION

Patent No. 3,003,357                      October 10, 1961

Frank A. Votta, Jr.

It is hereby certified that error appears in the above numbered patent requiring correction and that the said Letters Patent should read as corrected below.

Column 6, line 41, for "a" read -- to --.

Signed and sealed this 22nd day of October 1963.

(SEAL)
Attest:

ERNEST W. SWIDER
Attesting Officer

EDWIN L. REYNOLDS

Acting Commissioner of Patents